June 17, 1924.
A. E. LUKER
1,497,861
AUTOMOBILE LIGHT DEFLECTOR
Filed May 12, 1922
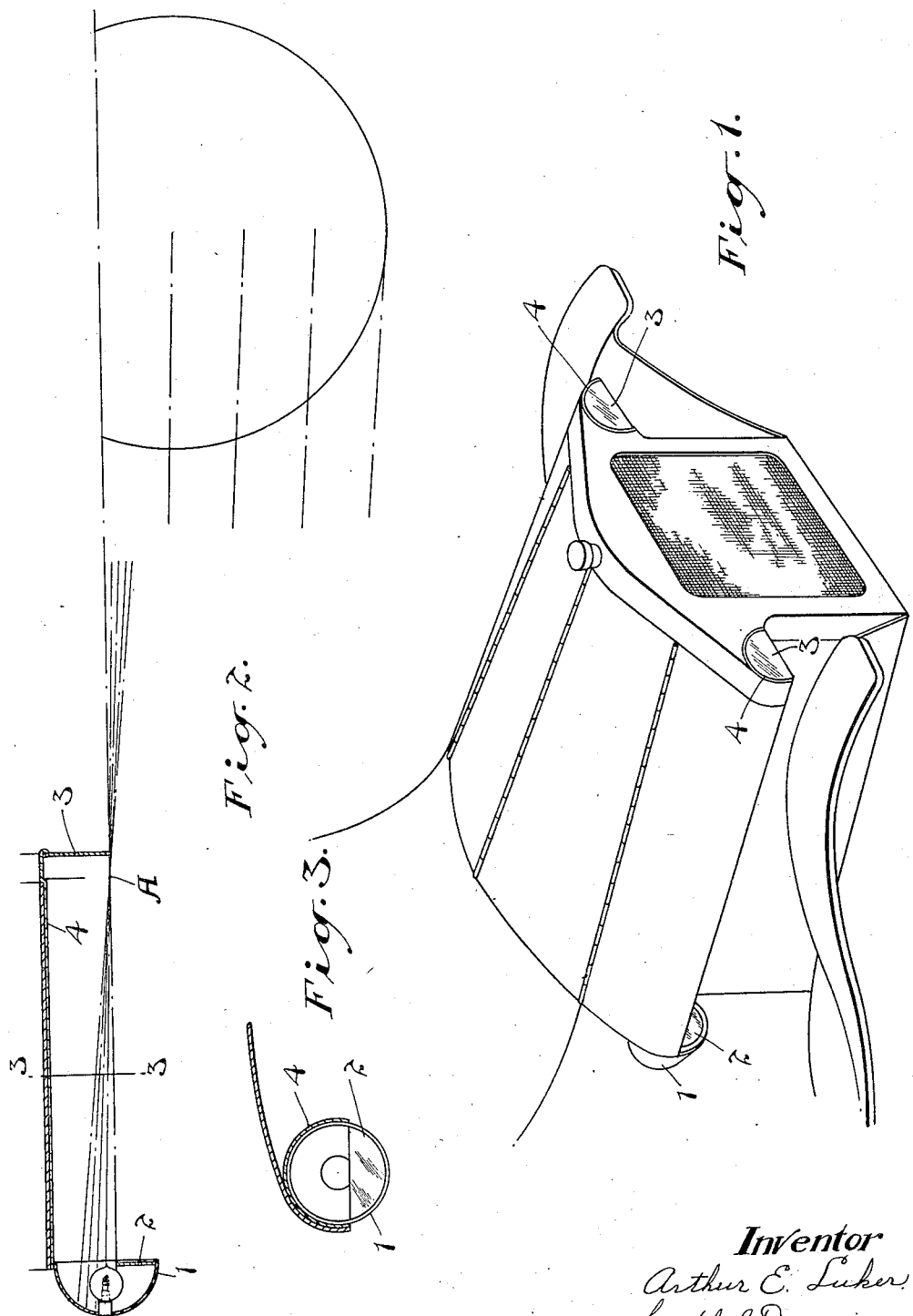
Inventor
Arthur E. Luker
by H. S. Dennison
Atty.

Patented June 17, 1924.

1,497,861

UNITED STATES PATENT OFFICE.

ARTHUR EVAN LUKER, OF OAKVILLE, ONTARIO, CANADA.

AUTOMOBILE LIGHT DEFLECTOR.

Application filed May 12, 1922. Serial No. 560,382.

*To all whom it may concern:*

Be it known that I, ARTHUR EVAN LUKER, a subject of the King of Great Britain, and resident of the town of Oakville, county of Halton, Province of Ontario, in the Dominion of Canada, have invented certain new and useful Improvements in Automobile Light Deflectors, described in the following specification and illustrated in the accompanying drawings, that form part of the same.

The principal objects of this invention are, to obviate the dangers incident to the blinding effect of strong focused lights on road vehicles, while maintaining sufficient light upon the road surface for safe and comfortable driving.

The principal feature of the invention consists in the novel manner of shrouding the light whereby the rays from the lamp in being projected are prevented from being directed upward by a longitudinally arranged hood extending outwardly from the upper part of the lamp past the point of convergence of the focused rays.

In the drawings, Figure 1 is a perspective view of the front portion of a motor car showing one application of my invention.

Figure 2 is a diagrammatic elevation showing the manner of projecting the light. Fig. 3 is a section on 3—3 Fig. 2.

In the matter of light projecting for motor cars it has been proposed to extend hooded shades from the upper half of the lamp but such shades have had the effect of too greatly shortening the range of the lamp, consequently the driving light is not sufficient.

According to the present invention the focused rays of light from the lower half of the lamp 1 are obscured by an opaque or semi-opaque covering 2 which preferably cuts the face of the lamp transversely a short distance below the center. This prevents the direct forward projection of rays from the lower half of the lamp. The rays from the upper half of the lamp are projected forwardly and downwardly and are focused to converge a certain distance from the lamp so as to spread and give the desired illumination at a certain distance from the lamp. Tests are easily made a distance of about twenty feet from the lamp.

In the illustration diagram, Figure 2 the lamp is focused so that the rays cross at a distance of about twenty seven inches from the lamp lens and just forward of this point A is arranged a semi-opaque-semi-circular glass 3 and a semi-cylindrical hood 4 extends from the top of the lamp to the top of the glass 3. This hood is preferably enameled white inside or silvered in order to give the best condition of reflection and the light from the reflector of the lamp 1 is projected from the lower portion thereof upwardly to strike the hood and it is then directed downwardly at a corresponding angle so as to give close in road light.

The central rays as indicated in Figure 2 cross at the point A and are projected below the front glass 3 and at a distance of about twenty feet a target of light of a semi-circular form and of about thirty inches in diameter is produced. The upper line of this target is approximately thirty eight inches from the ground and as the top of this target of light is cut by the upper transverse line of the light shield 2 and the lower transverse line of the shield 3, which are arranged in horizontal alignment the light rays will not rise above this level, consequently no direct rays of light strike the eyes of the driver of vehicle approaching a vehicle equipped with this invention. The light from the vehicle will however be projected forwardly without limitation other than the strength of the light.

Close in light will be strong because of the reflecting surface of the hood 4 gathering all the stray rays and throwing them downward close in front of the vehicle.

The hood may be arranged in many different ways but is shown in Figure 1 of the drawings as a part of the engine hood, the lamps being arranged close to the body of the car at the back end of said hood.

What I claim as my invention is:—

1. A light deflector, comprising, in combination with a circular lamp, of a shield covering the lower half of said lamp, a semi-cylindrical shaped hood extending forwardly from the upper half of the lamp, and a translucent semi-circular glass at the forward end of the hood having its bottom edge arranged substantially in horizontal alignment with the upper edge of the shield covering the lower half of the lamp.

2. An automobile light, comprising, a semi-cylindrical hood horizontally arranged alongside the hood of the car, a semi-circular translucent closure at the forward end of the hood, a lamp arranged at the back end of the hood and having its rays focused to cross beneath the horizontal edge of the translucent closure, and a semi-circular translucent cover arranged in the lower portion of the face of the lamp.

ARTHUR EVAN LUKER.